US008275306B2

(12) United States Patent
Attali

(10) Patent No.: US 8,275,306 B2
(45) Date of Patent: Sep. 25, 2012

(54) METHOD AND SYSTEM FOR EVALUATING VOCABULARY SIMILARITY

(75) Inventor: Yigal Attali, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 613 days.

(21) Appl. No.: 11/379,488

(22) Filed: Apr. 20, 2006

(65) Prior Publication Data

US 2006/0240390 A1   Oct. 26, 2006

Related U.S. Application Data

(60) Provisional application No. 60/673,073, filed on Apr. 20, 2005.

(51) Int. Cl.
*G09B 7/00* (2006.01)
(52) U.S. Cl. ......... 434/353; 434/322; 434/323; 434/350
(58) Field of Classification Search .................. 434/353; 704/9–11
See application file for complete search history.

(56) References Cited

U.S. PATENT DOCUMENTS

| | | | |
|---|---|---|---|
| 6,181,909 B1* | 1/2001 | Burstein et al. | 434/353 |
| 6,356,864 B1* | 3/2002 | Foltz et al. | 704/1 |
| 7,088,949 B2* | 8/2006 | Burstein et al. | 434/353 |
| 2004/0175687 A1* | 9/2004 | Burstein et al. | 434/353 |
| 2005/0142529 A1* | 6/2005 | Andreyev et al. | 434/362 |
| 2005/0143971 A1* | 6/2005 | Burstein et al. | 704/4 |

OTHER PUBLICATIONS

Salton et al. A Vector Space Model for Automatic Indexing. Communication of the ACM Nov. 1975.*
Srihari et al. Automated Scoring of Handwritten Essay Based on Latent Semantic Analysis. DAS 2006 LNCS 3872. pp. 71-83.*
Thomas et al. E-Assessment using Latent Semantic Analyis in the Computer Science Domain: A pilot Study. Proceedings of the Workshop on eLearning for Computational Linguistics and Computational Linguistics for eLearning. pp. 38-44. 2004.*
International Application of PCT Application No. PCT/US2006/014934, May 6, 2008, 2 pages.
Sahami, M., et al., *A Bayesian Approach to Filtering Junk E-Mail*, Learning for Text Categorization: Papers from the 1988 Workshop, AAAI Technical Report WS-98-05, 1988, 8 Pages.
Cohen, William W., et al., *Learning to Classify Email into "Speech Acts"*, EMNLP 2004, 2004, 8 Pages.
Joachims, T., *Optimizing Search Engines using Clickthrough Data*, Proceedings of the ACM Conference on Knowledge Discovery and Data Mining, 2002, 10 Pages.

(Continued)

*Primary Examiner* — Robert J Utama
(74) *Attorney, Agent, or Firm* — Jones Day

(57) ABSTRACT

A method, system and processor-readable storage medium for evaluating vocabulary similarity are disclosed. A generic rate may be determined for each word in a plurality of first responses. Each first response may respond to one of a plurality of first prompts. At least one first response may respond to each of the first prompts. A specific rate may be determined for each word in a plurality of second responses, which each respond to a second prompt. A target response may be received that is associated with the second prompt and has a plurality of words. A vocabulary similarity index may be computed for the target response based on one or more generic rates and on or more specific rates. A determination of whether the target response is off-topic may be made based on the vocabulary similarity index for the target response.

16 Claims, 2 Drawing Sheets

OTHER PUBLICATIONS

McCallum, A., et al., *Building Domain-Specific Search Engines with Machine Learning Techniques*, AAAI-99 Spring Symposium, Technical Report SS-99-03, 1999, pp. 28-39.

Allan, J., Carbonell, et al., *Topic Detection and Tracking Pilot Study Final Report*, Proceedings of the Broadcast News Transcription and Understanding Workshop, Feb. 1998, pp. 194-218.

Billsus, D., et al., *A Hybrid User Model for News Story Classification*, Proceedings of the Seventh International Conference on User Modeling, 1999, 10 Pages.

Hripcsak, George, MD., et al. *Unlocking Clinical Data from Narrative Reports: A Study of Natural Language Processing*, Ann Intern. Med., vol. 122, 1995, pp. 681-688.

Wilcox, Adam B., PhD., et al., *The Role of Domain Knowledge in Automating Medical Text Report Classification*, J. Am. Med. Inform. Assoc., vol. 10, 2003, pp. 330-338.

Page, Ellis B. *The Imminence of . . . Grading Essays by Computer*, Phi Delta Kappan, vol. 48, 1966, pp. 238-243.

Burstein, J., et al., *Automated Scoring Using Hybrid Feature Identification Technique*, Proceedings of 36th Annual Meeting of the Association of Computational Linguistics, 1998, pp. 206-210.

Foltz, P. W., et al., *The Measurement of Textual Coherence with Latent Semantic Analysis*, Discourse Processes, vol. 25 (2-3), 1998, pp. 285-307.

Larkey, L.S. *Automatic Essay Grading Using Text Categorization Techniques*, Proceedings of the 21st ACM-SIGIR Conference on Research and Development in Information Retrieval, 1998, pp. 90-95.

Elliott, S., *IntelliMetric™: From Here to Validity*, In Automated Essay Scoring: A Cross-Disciplinary Perspective, Shermis & Berstein, eds., 2003, pp. 70-86.

International Preliminary Report on Patentability dated Mar. 10, 2009 corresponding to International Patent Application No. PCT/US2006/014934.

\* cited by examiner

METHOD AND SYSTEM FOR EVALUATING VOCABULARY SIMILARITY

CROSS REFERENCE TO RELATED APPLICATION

This application claims priority to U.S. Provisional Patent Application No. 60/673,073 titled "METHOD AND SYSTEM FOR EVALUATING VOCABULARY SIMILARITY" filed Apr. 20, 2005, the disclosure of which is incorporated herein by reference in its entirety.

BACKGROUND

Much work has been performed in the area of text document classification. For example, e-mail sorting has been proposed in Sahami, Dumais, Heckerman & Horvitz, "A Bayesian Approach to Filtering Junk E-Mail," Learning For Text Categorization: Papers from the 1988 Workshop, AAAI Technical Report WS-98-05 (1998) and Cohen, Carvalho & Mitchell, "Learning to Classify Email in 'Speech Acts,'" EMNLP 2004, each of which is incorporated herein by reference in its entirety.

Text-document classification is also performed by Internet-based search engines, such as are described in Joachims, "Optimizing Search Engines Using Clickthrough Data," Proceedings of the ACM Conference on Knowledge Discovery and Data Mining (2002) and McCallum, Nigam, Rennie & Seymore, "Building Domain-Specific Search Engines with Machine Learning Techniques," AAAI-99 Spring Symposium, each of which is incorporated herein by reference in its entirety.

Other work teaches the classification of news articles, such as Allen, Carbonell, Doddington, Yamron & Yang, "Topic Detection and Tracking Pilot Study: Final Report," Proceedings of the Broadcast News Transcription and Understanding Workshop, pp 194-218 (1998) and Billsus & Pazzani, "A Hybrid User Model for News Story Classification," Proceedings of the Seventh International Conference on User Modeling (UM '99), Banff Canada (Jun. 20-24, 1999), each of which is incorporated herein by reference in its entirety.

Moreover, information in medical reports can be classified by text documentation classifiers, such as those taught by Hripcsak, Friedman, Alderson, DuMouchel, Johnson & Clayton, "Unlocking Clinical Data from Narrative Reports: A Study of Natural Language Processing," Ann Intern Med 122(9): 681-88 (1995); and Wilcox & Hripcsak, "The Role of Domain Knowledge in Automating Medical Text Report Classification," Journal of the American Medical Information Association 10:330-38 (2003), each of which is incorporated herein by reference in its entirety.

In addition, research has been performed in the area of automated essay scoring, such as by Page, "The Imminence of Grading Essays by Computer," Phi Delta Kappan 48:238-43 (1966); Burstein et al., "Automated Scoring Using a Hybrid Feature Identification Technique," Proceedings of 36th Annual Meeting of the Association of Computational Linguistics, pp 206-10 (1998); Foltz, Kintsch & Landauer, "Analysis of Text Coherence Using Latent Semantic Analysis," Discourse Processes 25(2-3): 285-307 (1998); Larkey, "Automatic Essay Grading Using Text Categorization Techniques," Proceedings of the 21st ACM-SIGIR Conference on Research and Development in Information Retrieval, pp 90-95 (1998); and Elliott, "Intellemetric: From Here to Validity," in Shermis & Berstein, eds., "Automated Essay Scoring: A Cross-Disciplinary Perspective" (2003), each of which is incorporated herein by reference in its entirety.

In the area of automated essay evaluation and scoring, systems have been developed that perform one or more natural language processing ("NLP") methods. For example, a first NLP method might include a scoring application that extracts linguistic features from an essay and uses a statistical model of how these features are related to overall writing quality in order to assign a ranking or score to the essay. A second NLP method might include an error evaluation application that evaluates errors in grammar, usage and mechanics, identifies and essay's discourse structure, and recognizes undesirable stylistics features.

Additional NLP methods can provide feedback to essay writers regarding whether an essay appears to be off-topic. In this context, an off-topic essay is an essay that pertains to a different subject than other essays in a training corpus, as determined by word usage. Such methods presently require the analysis of a significant number of essays that are written to a particular test question (i.e., a "prompt") and have been previously scored by a human reader to be used for training purposes.

One such method for determining if an essay is off-topic requires calculating two values determined based on the vocabulary used in an essay. In the method, a "z-score" is computed for each essay for each of two variables: a) a relationship between the words in the essay response and the words in a set of training essays written in response to the prompt (essay question) to which the essay responds, and b) a relationship between the words in the essay response and the words in the text of the essay prompt. A z-score value indicates an essay's relationship to the mean and standard deviation values of a particular variable based on a training corpus of human-scored essay data from which off-topic essays are excluded.

In order to identify off-topic essays, z-scores are computed for: a) the maximum cosine value, which is the highest cosine value among all cosines between an essay and all training essays, and b) the prompt cosine value, which is the cosine value between and essay and the text of the essay prompt. When a z-score exceeds a predefined threshold, the essay is likely to be anomalous (i.e., "off-topic"), since the threshold is typically set to a value representing an acceptable distance from the mean. These values can be used in an advisory feature set.

The equation for calculating a z-score for a particular essay is $$z = \frac{\text{Value} - \text{Mean}}{\text{Std. Dev.}}.$$

The mean and the standard deviation can relate to the maximum cosine value or the prompt cosine value. Z-score values can be used to determine, for example, the overly repetitious use of particular words in an essay and/or whether an essay is off-topic.

The accuracy of such an approach can be determined by examining the false positive rate and the false negative rate. The false positive rate is the percentage of appropriately written, on-topic essays that have been incorrectly identified as off-top essays. The false negative rate is the percentage of off-topic essays that have been incorrectly identified as on-topic. Typically, it is preferable to have a lower false positive rate so that a student is not incorrectly admonished for writing an off-topic essay. For a typical essay set, the false positive rate using this method is approximately 7%, and the false negative rate is approximately 33%.

What is needed is a method of determining vocabulary similarity for an essay with respect to the prompt to which the essay is answered which reduces the false positive and false negative error rates.

The disclosed embodiments are directed to solving one or more of the above-listed problems.

SUMMARY

Before the present methods, systems and materials are described, it is to be understood that the disclosed embodiments are not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to an "essay" is a reference to one or more essays and equivalents thereof known to those skilled in the are, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the disclosed embodiments are not entitled to antedate such disclosure by virtue of prior invention.

In an embodiment, a method of evaluating vocabulary similarity may include determining a generic rate for each word in a plurality of first responses. Each first response may respond to one of a plurality of first prompts. At least one first response may respond to each of the first prompts. The method may further include determining a specific rated for each word in a plurality of second responses. Each second response may respond to a second prompt. The method may further include receiving a target response that is associated with the second prompt and has a plurality of words, calculating a vocabulary similarity index for the target response based on one or more generic rates and one or more specific rates, and determining whether the target response is off-topic based on the vocabulary similarity index for the target response.

In an embodiment, a system for evaluating vocabulary similarity may include a processor, and a processor-readable storage medium in communication with the processor. The processor-readable storage medium may contain one or more programming instructions for performing a method of evaluating vocabulary similarity as described above.

In an embodiment, a processor-readable storage medium may contain one or more programming instructions for performing a method of evaluating vocabulary similarity as described above.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

Figure 1:
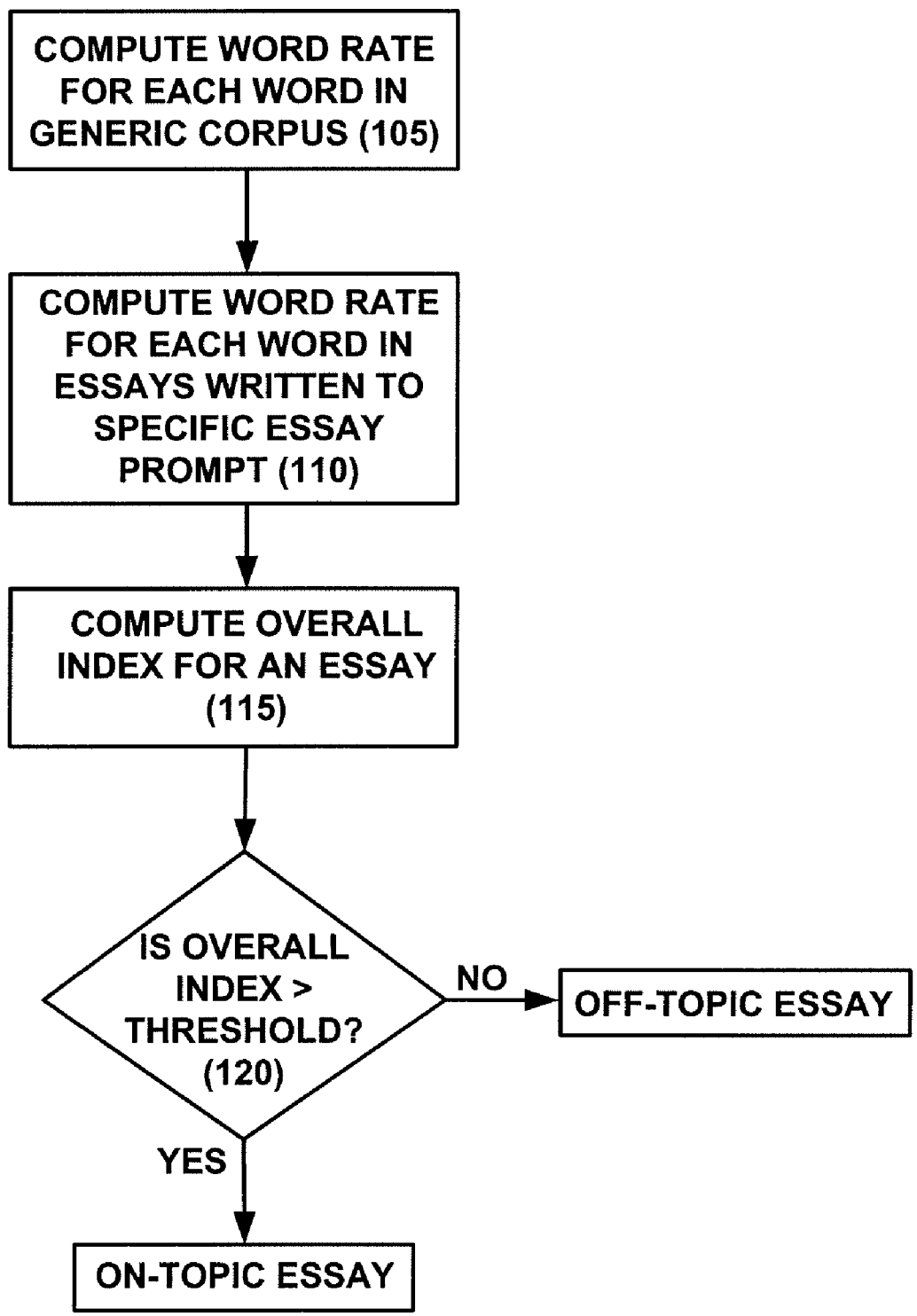
FIG. 1 depicts a flow diagram of an exemplary method of evaluating vocabulary similarity for a target essay according to an embodiment.

FIG. 1 depicts a flow diagram of an exemplary method of evaluating vocabulary similarity for a target essay according to an embodiment. As shown in FIG. 1, the similarity of vocabulary used for the target essay may be evaluated by calculating an index. The index may be computed using, for example, two rates for each word used in the target essay. The rates may include, for each word in the target essay, a) a number of essays written in response to a plurality of prompts (i.e., generic or prompt-independent essays) in which the word occurs divided by the total number of generic essays considered (i.e., a generic or prompt-independent rate) 105 and b) a number of essays written in response to the same prompt as the target essay in which the word occurs (i.e., prompt-specific essays) divided by the total number of prompt-specific essays considered (i.e., a local or prompt-specific rate) 110.

The generic rate for each word ($G_i$) may be determined 105 by considering a large number of sample essays. In an embodiment, the generic rates may be computed 105 once using essay responses from different prompts that are used within a particular program and/or at one or more particular grade levels. The generic rate may be a base-rate level of usage for each word in a plurality of essay responses. For example, if a particular word occurs in 8 of 50 essays written to a plurality of prompts, the $G_i$ for that word may equal 0.16.

The prompt-specific rates ($S_i$) may be computed 110 from a training sample of essays written to a specific prompt. The specific prompt may be the same as the prompt to which a target essay is written. The prompt-specific rate may be a local estimation of a level of usage for each word in a plurality of essay responses written to the same prompt. For example, if a particular word occurs in 4 of 10 essays written to a specific prompt, the $S_i$ for that word may equal 0.40.

The generic rate and the prompt-specific rate may be used to compute 115 an overall index for each essay. In an embodiment, the index may be computed 115 using the following equation:

$$\text{index} = \frac{1}{N} \sum_{i=1}^{n} \sqrt{S_i(1-G_i)}.$$

In the formula, N may equal the number of words in an essay. The rates, $S_i$ and $G_i$, may be computed for each of the N words in a target essay. A word that appears in every generic essay may be assigned a $G_i$ of 1. A word that does not appear in any specific essay may be assigned a $S_i$ of 0. For each of these cases the resulting weight for such a word may equal 0. In other words, the occurrence of such a word in the target essay may not be useful in determining whether the target essay is off-topic.

The index may represent an average of a plurality of word weights. In an embodiment, a word weight may be greater for a word that appears more frequently in the plurality of prompt-specific essays and less frequently in the plurality of prompt-independent essays. As such, a word having a relatively large word weight value may be more relevant to determining whether a target essay is off-topic.

In an embodiment, the range of word weights may be between 0 (when a word is never used in a prompt-specific response and/or is used in each generic essay) and 1 (when a word is used in every specific essay and is never used in a generic essay), inclusive. By taking the square root of the $S_i(1-G_i)$ term, words having higher word weights may have more of an effect in determining an off-topic essay as compared to words having lower word weights. In alternated embodiments, the $S_i(1-G_i)$ term may be raised to a different power, such as ⅓ or 1. Modifying the power to which the $S_i(1-G_i)$ term is raised may affect the effect that words having higher word weights have on the determination of whether a target essay is an off-topic essay.

The classification of a target essay as off-topic or on-topic may be determined 120 by comparing the computed index value for the essay with a threshold. The threshold may be based on a distribution of index values in a prompt-specific training sample. For example, the threshold may be set to equal the fifth-percentile value in the distribution. Different thresholds may be assigned within the scope of the disclosure as will be apparent to those of ordinary skill in the art.

Figure 2:
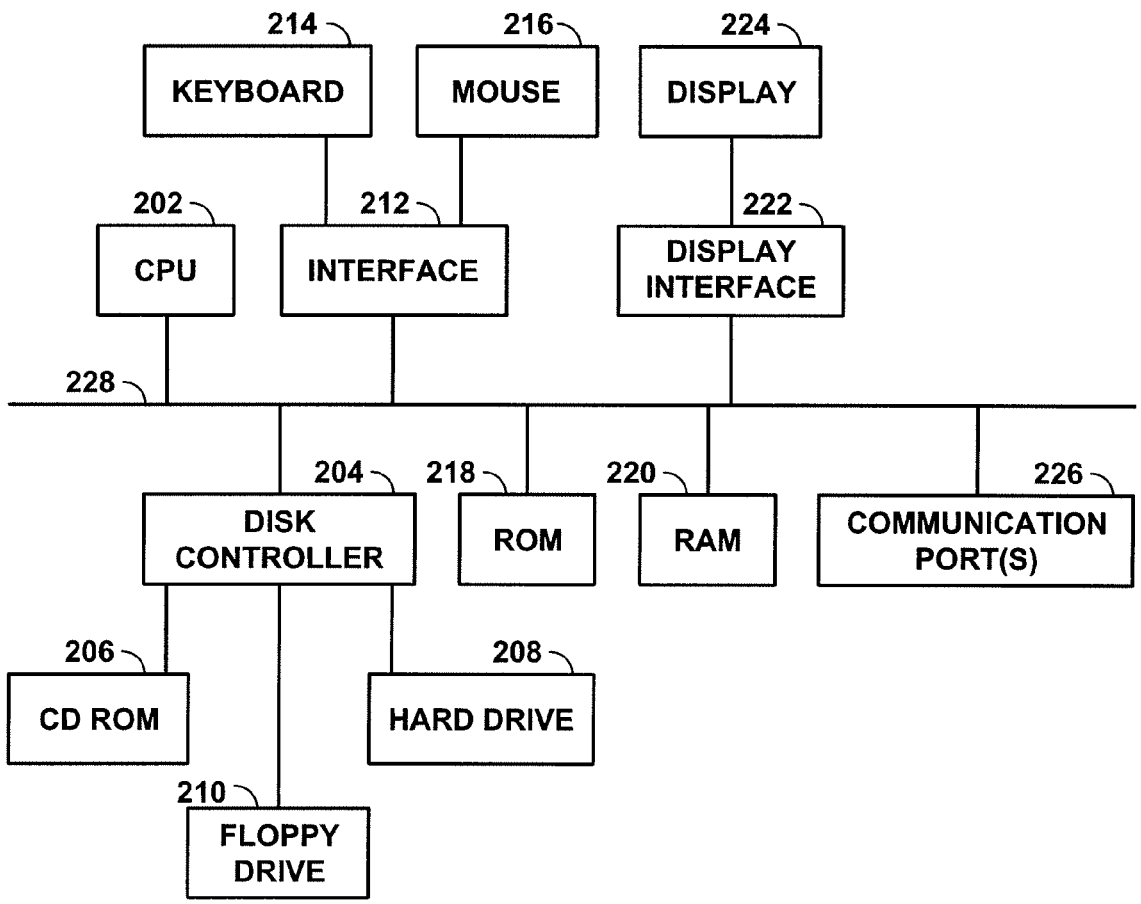
FIG. 2 depicts a block diagram of exemplary internal hardware that may be used to contain or implement program instructions according to an embodiment.

FIG. 2 is a block diagram of exemplary internal hardware that may be used to contain or implement program instructions according to an embodiment. Referring to FIG. 2, a bus 228 serves as the main information highway interconnecting the other illustrated components of the hardware. CPU 202 is the central processing unit of the system, performing calculations and logic operations required to execute a program. Read only memory (ROM) 218 and random access memory (RAM) 220 constitute exemplary memory devices.

A disk controller 204 interfaces with one or more optional disk drives to the system bus 228. These disk drives may be external of internal floppy CD ROM drives 206, hard drives 208 or DVD drives 210. As indicated previously, these various disk drives and disk controllers are optional devices.

Program instructions may be stored in the ROM 218 and/or the RAM 220. Optionally, program instructions may be stored on a computer readable medium such as a floppy disk or a digital disk or other recording medium, a communications signal or a carrier wave.

An optional display interface 222 may permit information from the bus 228 to be displayed on the display 224 in audio, graphic or alphanumeric format. Communication with external devices may optionally occur using various communication ports 226. An exemplary communication port 226 may be attached to a communications network, such as the Internet of an intranet.

In addition to the standard computer-type components, the hardware may also include an interface 212 which allows for receipt of data from input devices such as a keyboard 214 or other input device 216 such as a remote control, pointer and/or joystick.

An embedded system may optionally be used to perform one, some or all of the disclosed operations. Likewise, a multiprocessor system may optionally be used to perform one, some or all of the disclosed operations.

It is to be understood that the disclosed embodiments are not limited in application to the details of construction and to the arrangements of the components or steps set forth in this description or illustrated in the drawings. The disclosed methods and systems are capable of other embodiments and of being practiced and carried out in various ways. Hence, it is to be understood that the phraseology and terminology employed herein are for the purpose of description and should not be regarded as limiting.

As such, those of ordinary skill in the art will appreciate that the conception upon which this disclosure is based may readily be utilized as a basis for the designing of other structures, methods and systems for carrying out the several purposes of the disclosed embodiments. It is important, therefore, that the claims by regarded as including such equivalent constructions insofar as they do not depart from the spirit and scope of the disclosed embodiment.

What is claimed is:

1. A computer-implemented method of evaluating vocabulary, the method comprising:
   determining with a computer system a generic occurrence rate for each word in a plurality of first sample essays by, for each word, setting the generic occurrence rate equal to a number of first sample essays in which the word occurs divided by a total number of first sample essays, wherein each first sample essay responds to one of a plurality of first prompts, and wherein at least one first sample essay responds to each of the first prompts;
   determining with the computer system a specific occurrence rate for each word in a plurality of second sample essays by, for each word, setting the specific occurrence rate equal to a number of second sample essays in which the word occurs divided by a total number of second sample essays, wherein each second sample essay responds to a second prompt;
   receiving a target essay response having a plurality of words, wherein the target essay response is associated with the second prompt;
   calculating with the computer system a vocabulary similarity index for the target essay response based on one or more generic occurrence rates and one or more specific occurrence rates by, for each word in the target essay response, calculating a value based on the generic occurrence rate for the word and the specific occurrence rate for the word, and setting the vocabulary similarity index to an average of the computed values; and
   evaluating and displaying whether the target essay response is off-topic based on comparing the vocabulary similarity index for the target essay response with a predetermined threshold,
   the calculating and evaluating thereby providing an evaluation of whether the target essay response is off-topic based upon the generic occurrence rates of the first sample essays and the specific occurrence rates of the second sample essays.

2. The method of claim 1 wherein calculating a value based on the generic occurrence rate for the word and the specific occurrence rate for the word comprises calculating $\sqrt{S(1-G)}$, wherein S is the specific occurrence rate for the word, wherein G is the generic occurrence rate for the word.

3. A system for evaluating vocabulary similarity, the system comprising:
   a processor; and
   a processor-readable storage medium in communication with the processor,
   wherein the processor-readable storage medium contains one or more programming instructions for causing the processor to execute steps comprising:
   determining with a computer system a generic occurrence rate for each word in a plurality of first sample essays by, for each word, setting the generic occurrence rate equal to a number of first sample essays in which the word occurs divided by a total number of first sample essays, wherein each first sample essay responds to one of a plurality of first prompts, and wherein at least one first sample essay responds to each of the first prompts;
   determining with the computer system a specific occurrence rate for each word in a plurality of second sample essays by, for each word, setting the specific occurrence rate equal to a number of second sample essays in which the word occurs divided by a total number of second sample essays, wherein each second sample essay responds to a second prompt;
   receiving a target essay response having a plurality of words, wherein the target essay response is associated with the second prompt;
   calculating with the computer system a vocabulary similarity index for the target essay response based on one or more generic occurrence rates and one or more specific occurrence rates by, for each word in the target essay response, calculating a value based on the generic occurrence rate for the word and the specific occurrence rate for the word, and setting the vocabulary similarity index to an average of the computed values; and evaluating and displaying whether the target essay response is off-topic based on comparing the vocabulary similarity index for the target essay response with a predetermined threshold, the calculating and evaluating thereby providing an evaluation of whether the target essay response is off-topic based upon the generic occurrence rates of the first sample essays and the specific occurrence rates of the second sample essays.

4. The system of claim 3 wherein calculating a value based on the generic occurrence rate for the word and the specific occurrence rate for the word comprises calculating $\sqrt{S(1-G)}$, wherein S is the specific occurrence rate for the word, wherein G is the generic occurrence rate for the word.

5. A processor-readable storage medium containing one or more programming instructions for evaluating vocabulary similarity, the programming instructions causing a processing system to execute steps comprising:

determining with a computer system a generic occurrence rate for each word in a plurality of first sample essays by, for each word, setting the generic occurrence rate equal to a number of first sample essays in which the word occurs divided by a total number of first sample essays, wherein each first sample essay responds to one of a plurality of first prompts, and wherein at least one first sample essay responds to each of the first prompts;

determining with the computer system a specific occurrence rate for each word in a plurality of second sample essays by, for each word, setting the specific occurrence rate equal to a number of second sample essays in which the word occurs divided by a total number of second sample essays, wherein each second sample essay responds to a second prompt;

receiving a target essay response having a plurality of words, wherein the target essay response is associated with the second prompt;

calculating with the computer system a vocabulary similarity index for the target essay response based on one or more generic occurrence rates and one or more specific occurrence rates by, for each word in the target essay response, calculating a value based on the generic occurrence rate for the word and the specific occurrence rate for the word, and setting the vocabulary similarity index to an average of the computed values; and evaluating and displaying whether the target essay response is off-topic based on comparing the vocabulary similarity index for the target essay response with a predetermined threshold, the calculating and evaluating thereby providing an evaluation of whether the target essay response is off-topic based upon the generic occurrence rates of the first sample essays and the specific occurrence rates of the second sample essays.

6. The processor-readable storage medium of claim 5 wherein calculating a value based on the generic occurrence rate for the word and the specific occurrence rate for the word comprises calculating $\sqrt{S(1-G)}$, wherein S is the specific occurrence rate for the word, wherein G is the generic occurrence rate for the word.

7. The method of claim 1, wherein the predetermined threshold is based on a distribution of vocabulary similarity index values in a prompt-specific training sample.

8. The method of claim 7, wherein the predetermined threshold is set to equal the fifth-percentile value in the distribution.

9. The method of claim 1, wherein calculating a value based on the generic occurrence rate for the word and the specific occurrence rate for the word comprises calculating $$\sqrt[3]{S(1-G)},$$

wherein S is the specific occurrence rate for the word, wherein G is the generic occurrence rate for the word.

10. The method of claim 1, wherein calculating a value based on the generic occurrence rate for the word and the specific occurrence rate for the word comprises calculating $S(1-G)$, wherein S is the specific occurrence rate for the word, wherein G is the generic occurrence rate for the word.

11. The method of claim 1, wherein calculating a vocabulary similarity index for the target essay response comprises calculating $$\frac{1}{N}\sum_{i=1}^{n} \sqrt{S_i(1-G_i)},$$

wherein N is the number of words in the target essay response, $S_i$ is the specific occurrence rate for a particular word i in the target essay response, and $G_i$ is the generic occurrence rate for the word i in the target essay response.

12. The system of claim 3, wherein the predetermined threshold is based on a distribution of vocabulary similarity index values in a prompt-specific training sample.

13. The system of claim 12, wherein the predetermined threshold is set to equal the fifth-percentile value in the distribution.

14. The system of claim 3, wherein calculating a value based on the generic occurrence rate for the word and the specific occurrence rate for the word comprises calculating $$\sqrt[3]{S(1-G)},$$

wherein S is the specific occurrence rate for the word, wherein G is the generic occurrence rate for the word.

15. The system of claim 3, wherein calculating a value based on the generic occurrence rate for the word and the specific occurrence rate for the word comprises calculating $S(1-G)$, wherein S is the specific occurrence rate for the word, wherein G is the generic occurrence rate for the word.

16. The system of claim 3, wherein calculating a vocabulary similarity index for the target essay response comprises calculating $$\frac{1}{N}\sum_{i=1}^{n} \sqrt{S_i(1-G_i)},$$

wherein N is the number of words in the target essay response, $S_i$ is the specific occurrence rate for a particular word i in the target essay response, and $G_i$ is the generic occurrence rate for the word i in the target essay response.

* * * * *

UNITED STATES PATENT AND TRADEMARK OFFICE
CERTIFICATE OF CORRECTION

| | | |
|---|---|---|
| PATENT NO. | : 8,275,306 B2 | Page 1 of 1 |
| APPLICATION NO. | : 11/379488 | |
| DATED | : September 25, 2012 | |
| INVENTOR(S) | : Yigal Attali | |

It is certified that error appears in the above-identified patent and that said Letters Patent is hereby corrected as shown below:

Page 1, Abstract, Line 12, delete "generic rates and on or more specific rates" and substitute therefore -- generic rates and one or more specific rates --.

Signed and Sealed this

Thirteenth Day of November, 2012

David J. Kappos
*Director of the United States Patent and Trademark Office*